(12) United States Patent
Bonner et al.

(10) Patent No.: US 11,031,219 B2
(45) Date of Patent: Jun. 8, 2021

(54) SWATH® TO EXTEND DYNAMIC RANGE

(71) Applicants: DH TECHNOLOGIES DEVELOPMENT PTE. LTD., Singapore (SG); University of Geneva, Geneva (CH)

(72) Inventors: Ronald Francis Bonner, Newmarket (CA); Lyle Lorrence Burton, Woodbridge (CA); Gérard Hopfgartner, Geneva (CH); Gordana Ivosev, Etobicoke (CA)

(73) Assignees: DH Technologies Development Pte. Ltd., Singapore (SG); University of Geneva

(*) Notice: Subject to any disclaimer, the term of this patent is extended or adjusted under 35 U.S.C. 154(b) by 248 days.

(21) Appl. No.: 16/310,047

(22) PCT Filed: Jun. 9, 2017

(86) PCT No.: PCT/IB2017/053436
§ 371 (c)(1),
(2) Date: Dec. 14, 2018

(87) PCT Pub. No.: WO2017/216692
PCT Pub. Date: Dec. 21, 2017

(65) Prior Publication Data
US 2020/0312644 A1 Oct. 1, 2020

Related U.S. Application Data

(60) Provisional application No. 62/350,325, filed on Jun. 15, 2016.

(51) Int. Cl.
*H01J 49/00* (2006.01)
*G01N 30/72* (2006.01)

(52) U.S. Cl.
CPC ...... *H01J 49/0072* (2013.01); *G01N 30/7233* (2013.01); *H01J 49/0036* (2013.01)

(58) Field of Classification Search
CPC .... H01J 49/0004; H01J 49/0072; H01J 49/02; H01J 49/025; H01J 49/0027; H01J 49/0031; H01J 49/0036
(Continued)

(56) References Cited

U.S. PATENT DOCUMENTS

| 2014/0156203 A1 | 6/2014 | Yamaguchi |
| 2016/0086783 A1 | 3/2016 | Cox et al. |
| 2016/0109424 A1 | 4/2016 | Johansen |

FOREIGN PATENT DOCUMENTS

| WO | 2016-075565 A1 | 5/2016 | |
| WO | WO-2016075565 A1 * | 5/2016 | ............. G01N 30/86 |

OTHER PUBLICATIONS

Bilbao et al., Processing Strategies and Software Solutions for Data-independent Acquisition in Mass Spectrometry, 2015, Proteomics, 15, pp. 965-980. (Year: 2015).*

(Continued)

*Primary Examiner* — Jason L McCormack
(74) *Attorney, Agent, or Firm* — John R. Kasha; Kelly L. Kasha; Kasha Law LLC

(57) ABSTRACT

Systems and methods are disclosed for determining if the dynamic range of quantitation in mass spectrometry can be extended. A DIA method is performed on a sample for a compound of interest at each acquisition time of a plurality of acquisition times. A plurality of product ion spectra are produced for each window of two or more precursor ion mass selection windows. A known product ion of the compound of interest is selected. Two or more XICs are calculated from two or more different precursor ion windows for the known product ion. A ratio of one XIC of the two or more XICs to at least one other XIC of the two or more XICs (Continued)

is calculated. If the ratio is above a threshold, the XIC is used in the quantitation. If not, two or more XICs can be combined into a single XIC that is used for the quantitation.

10 Claims, 11 Drawing Sheets

(58) Field of Classification Search
USPC .................................. 250/281, 282, 288
See application file for complete search history.

(56) References Cited

OTHER PUBLICATIONS

International Search Report and Written Opinion for PCT/IB2017/053436, dated Oct. 11, 2017.
Aivett Bilbao et al. "Processing Strategies and Software Solutions for Data-Independent Acquisition in Mass Spectrometry," Proteomics, vol. 15, issue 5-6, Mar. 2015, pp. 964-980 and Figures 1, 2.

* cited by examiner

SWATH® TO EXTEND DYNAMIC RANGE

CROSS REFERENCE TO RELATED APPLICATION

This application claims the benefit of U.S. Provisional Patent Application Ser. No. 62/350,325, filed Jun. 15, 2016, the content of which is incorporated by reference herein in its entirety.

INTRODUCTION

The teachings herein relate to extending the quantifiable range of a compound of interest in liquid chromatography mass spectrometry (LC-MS) or liquid chromatography mass spectrometry/mass spectrometry (LC-MS/MS). More particularly the teachings herein relate to systems and methods for extending the quantifiable range of a compound of interest by using a data independent acquisition (DIA) method in LC-MS/MS and combining intensities of known, specific product ions from two or more precursor ions.

LC-MS and LC-MS/MS Background

Mass spectrometry (MS) is an analytical technique for detection and quantitation of chemical compounds based on the analysis of mass-to-charge ratios (m/z) of ions formed from those compounds. The combination of mass spectrometry (MS) and liquid chromatography (LC) is an important analytical tool for identification and quantitation of compounds within a mixture. Generally, in liquid chromatography, a fluid sample under analysis is passed through a column filled with a chemically treated solid adsorbent material (typically in the form of small solid particles, e.g., silica). Due to slightly different interactions of components of the mixture with the solid adsorbent material (typically referred to as the stationary phase), the different components can have different transit (elution) times through the packed column, resulting in separation of the various components. In LC-MS, the effluent exiting the LC column can be continuously subjected to mass spectrometric analysis. The data from this analysis can be processed to generate an extracted ion chromatogram (XIC), which can depict detected ion intensity (a measure of the number of detected ions of one or more particular analytes) as a function of retention time.

In some cases, the LC effluent can be subjected to tandem mass spectrometry (or mass spectrometry/mass spectrometry MS/MS) for the identification of product ions corresponding to the peaks in the XIC. For example, the precursor ions can be selected based on their mass/charge ratio to be subjected to subsequent stages of mass analysis. For example, the selected precursor ions can be fragmented (e.g., via collision induced dissociation), and the fragmented ions (product ions) can be analyzed via a subsequent stage of mass spectrometry.

Tandem Mass Spectrometry or MS/MS Background

Tandem mass spectrometry or MS/MS involves ionization of one or more compounds of interest from a sample, selection of one or more precursor ions of the one or more compounds, fragmentation of the one or more precursor ions into product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. These workflows can include, but are not limited to, targeted acquisition, information dependent acquisition (IDA) or data dependent acquisition (DDA), and data independent acquisition (DIA).

In a targeted acquisition method, one or more transitions of a precursor ion to a product ion are predefined for a compound of interest. As a sample is being introduced into the tandem mass spectrometer, the one or more transitions are interrogated during each time period or cycle of a plurality of time periods or cycles. In other words, the mass spectrometer selects and fragments the precursor ion of each transition and performs a targeted mass analysis for the product ion of the transition. As a result, a chromatogram (the variation of the intensity with retention time) is produced for each transition. Targeted acquisition methods include, but are not limited to, multiple reaction monitoring (MRM) and selected reaction monitoring (SRM).

In an IDA (or DDA) method, a user can specify criteria for collecting mass spectra of product ions while a sample is being introduced into the tandem mass spectrometer. For example, in an IDA method a precursor ion or mass spectrometry (MS) survey scan is performed to generate a precursor ion peak list. The user can select criteria to filter the peak list for a subset of the precursor ions on the peak list. The survey scan and peak list are periodically refreshed or updated, and MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other applications, however, the complexity and dynamic range of compounds is very large. This poses challenges for traditional targeted and IDA methods, requiring very high speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a DIA method the actions of the tandem mass spectrometer are not varied among MS/MS scans based on data acquired in a previous precursor or survey scan. Instead a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, can take a long time and is not practical for some instruments and experiments.

As a result, a larger precursor ion mass selection window, or selection window with a greater width, is stepped across the entire precursor mass range. This type of DIA method is called, for example, SWATH® acquisition (sequential windowed acquisition). In a SWATH® acquisition, the precursor ion mass selection window stepped across the precursor mass range in each cycle may have a width of 5-25 amu, or even larger. Like the MS/MS$^{ALL}$ method, all of the precursor ions in each precursor ion mass selection window are fragmented, and all of the product ions of all of the precursor ions in each mass selection window are mass analyzed. However, because a wider precursor ion mass selection window is used, the cycle time can be significantly reduced in comparison to the cycle time of the MS/MS$^{ALL}$ method.

U.S. Pat. No. 8,809,770 describes how SWATH® acquisition can be used to provide quantitative and qualitative information about the precursor ions of compounds of interest. In particular, the product ions found from fragmenting a precursor ion mass selection window are compared to a database of known product ions of compounds of interest. In addition, ion traces or extracted ion chromatograms (XICs) of the product ions found from fragmenting a precursor ion mass selection window are analyzed to provide quantitative and qualitative information.

Quantitation by mass spectrometry typically uses MRM and LC as an introduction system. A response, for example from a particular MRM transition, is measured during the time when the compound of interest is expected to elute from the LC column. A chromatogram (XIC) is generated, processed to determine the area of any peaks present in the chromatogram and the corresponding quantity is calculated from a calibration curve or from the ratio to a standard of known concentration. It is well known that a measured signal of a compound or analyte of interest will at first increase linearly with concentration, but will eventually reach a plateau that limits the maximum concentration that can be measured. The concentration range that gives a linear response is known as the linear dynamic range. This signal plateau or roll over is generally attributed to saturation in the ion source, the detector, or the column, such that increasing the concentration of the compound of interest no longer causes an increase in the number of ions created or detected.

This signal plateau may also be attributed to the formation of adducts, dimers, trimers, multiply charged ions, and other species. While many compounds are ionized by the addition (positive mode) or removal (negative mode) of protons to give ions of the form M+H$^+$ and M−H$^-$, other species can be added, for example, Na$^+$, NH$_4^+$, K$^+$, CHO$_2^-$, C$_2$H$_3$O$_2^-$, etc.; these forms are generally known as adducts. These ions can arise from ionic buffers added to the LC solvents to improve separation (for example sodium or ammonium formate or acetate) but sodium and potassium can also leach from glassware. Further, species containing multiple molecules (dimers and trimers) can also be observed, e.g., 2M+H$^+$, 2M+Na$^+$, 3M+H$^+$, etc. and all the molecular ion(s) may fragment in the ion introduction optics generating fragment ions corresponding to the loss of H$_2$O, CO$_2$, etc. In larger species, such as proteins and peptides, multiply charged ions such as M+2H$^{2+}$, M+3H$^{3+}$, etc. can also be formed.

Accordingly, there is a need for improved systems and methods for performing LC-MS or LC-MS/MS, and more particularly for such methods and systems that can extend the quantitation dynamic range of a compound of interest.

SUMMARY

A system and method are disclosed for extending the dynamic range of a quantitation calculation of a known compound of interest. The dynamic range is extended by combining two or more product ion extracted ion chromatograms (XICs) produced from two or more different precursor ions of the known compound of interest.

The system and method for extending the dynamic range of a quantitation calculation includes a sample introduction device, an ion source device, a tandem mass spectrometer, and a processor. The sample introduction device introduces a sample over time. The sample includes one or more compounds of interest. The ion source device ionizes the sample to transform the sample into an ion beam.

The tandem mass spectrometer divides a precursor ion mass range of interest into a plurality of precursor ion mass selection windows for a DIA method. It performs the DIA method on the ion beam at each acquisition time of a plurality of acquisition times. The DIA method is performed by, for each window of the plurality of precursor ion mass selection windows, fragmenting the precursor ions in the window producing product ions and mass analyzing the product ions produced. A product ion spectrum is produced for each window of the plurality of precursor ion mass selection windows at each acquisition time of the plurality of acquisition times. Therefore, over the plurality of acquisition times, a plurality of product ion spectra are produced for each window of the plurality of precursor ion mass selection windows.

The processor receives a plurality of product ion spectra for each window of the plurality of precursor ion mass selection windows from the tandem mass spectrometer. It selects a mass-to-charge ratio (m/z) value for at least one known product ion of the compound of interest. It calculates an XIC for the m/z value from a plurality of product ion spectra of two or more different windows of the plurality of precursor ion mass selection windows. This produces two or more XICs. It combines the two or more XICs into a single XIC that has a larger dynamic range. Finally, it calculates a quantity for compound of interest using the single XIC.

A system and method are disclosed for determining if the dynamic range of a quantitation using a single XIC can be extended. More specifically, it is determined before, during, or after the quantitation of a known compound of interest using one XIC if the dynamic range of the quantitation can be increased by including one or more additional XICs in the quantitation calculation. The determination is made using a DIA method.

As in the system and method to extend the dynamic range, the system and method here use a sample introduction device, ion source device, and tandem mass spectrometer to produce a plurality of product ion spectra for each window of the plurality of precursor ion mass selection over the plurality of acquisition times.

Also, as in the system and method to extend the dynamic range, the system and method here use a processor to produce two or more XICs for the same product ion from the spectra for each window. In the system and method here, however, the processor calculates a ratio of an XIC of the two or more XICs to at least one other XIC of the two or more XICs. If the ratio exceeds a threshold, the processor determines that the dynamic range of a quantitation calculation of the known compound of interest cannot be extended and calculates a quantity of the known compound of interest using the XIC. In other words, the processor compares a first XIC to one or more other XICs. If the comparison shows that the one or more other XICs are unlikely to extend the dynamic range, then the quantity of the known compound of interest is simply calculated from the first XIC.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
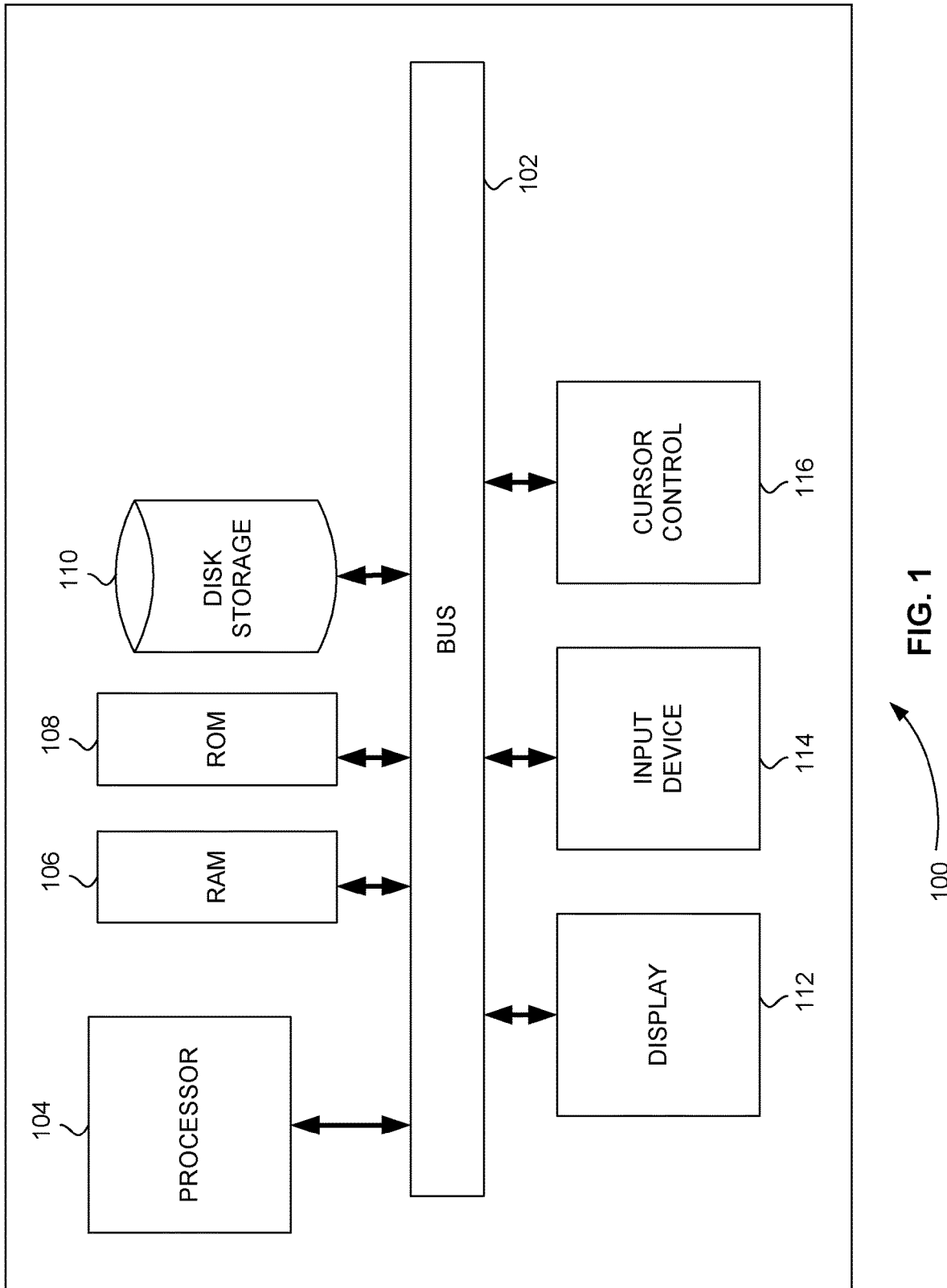
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106. Precursor ion mass selection media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Extending Dynamic Range

As described above, it is well known that in quantitation a measured signal of a compound or analyte of interest will at first increase linearly with concentration, but will eventually reach a plateau that limits the maximum concentration that can be measured. The concentration range that gives a linear response is known as the linear dynamic range. This signal plateau in the linear dynamic range is generally attributed to saturation in the ion source, the detector, or the column, such that increasing the concentration of the compound of interest no longer causes a linear increase in the number of ions created or detected. This signal plateau may also be attributed to the formation of adducts, dimers, trimers, and multiply charged ions.

Accordingly, there is a need for improved systems and methods for performing LC-MS or LC-MS/MS, and more particularly for such methods and systems that can extend the quantitation dynamic range of a compound of interest based on knowledge about the different product ions that can be formed.

Figure 2:
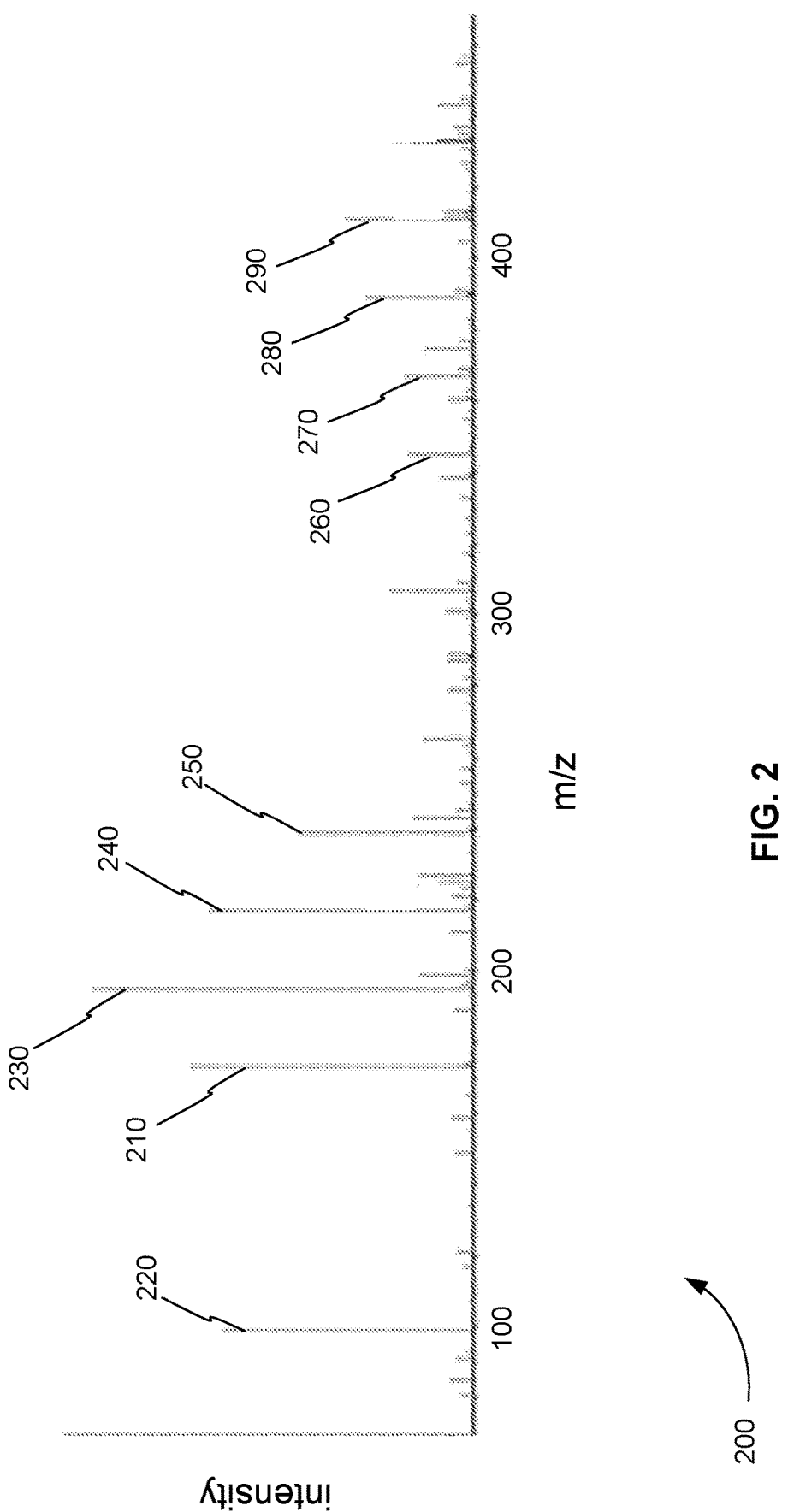
FIG. 2 is a plot of an exemplary precursor ion background subtracted mass spectrum measured during a flow injection analysis of glycerol 3-phosphate (molecular weight (MW) =172.01368) at a relatively high concentration, in accordance with various embodiments.

FIG. 2 is a plot 200 of an exemplary precursor ion background subtracted mass spectrum measured during a flow injection analysis of glycerol 3-phosphate (molecular weight (MW)=172.01368) at a relatively high concentration, in accordance with various embodiments. Plot 200 shows complex patterns of adducts and fragments. For example, peak 210 at 173.0205 m/z corresponds to the expected M+H+ ion that can fragment to give the peak 220 at 98.9838 m/z, which is protonated phosphoric acid ($H_3PO_4+H^+$).

Also prominent are a series of peaks 230, 240, and 250 at 195.0026 m/z, 216.9845 m/z, 238.9663 m/z, respectively, which differ by 21.9820. These ions, which correspond to successive addition of sodium and loss of H, are likely caused by sodium ions replacing labile protons such that the mass increases but the charge does not. Note that a similar pattern of peaks 260, 270, 280, and 290 is also observed at 345.0338 m/z, 367.0158 m/z, 388.9977 m/z, 410.9793 m/z, respectively, corresponding to Na—H replacement in a dimeric species, e.g., $2M+H+(Na—H)^+$.

In various embodiments, the adducts and fragments of glycerol 3-phosphate are determined to be concentration dependent.

Figure 3:
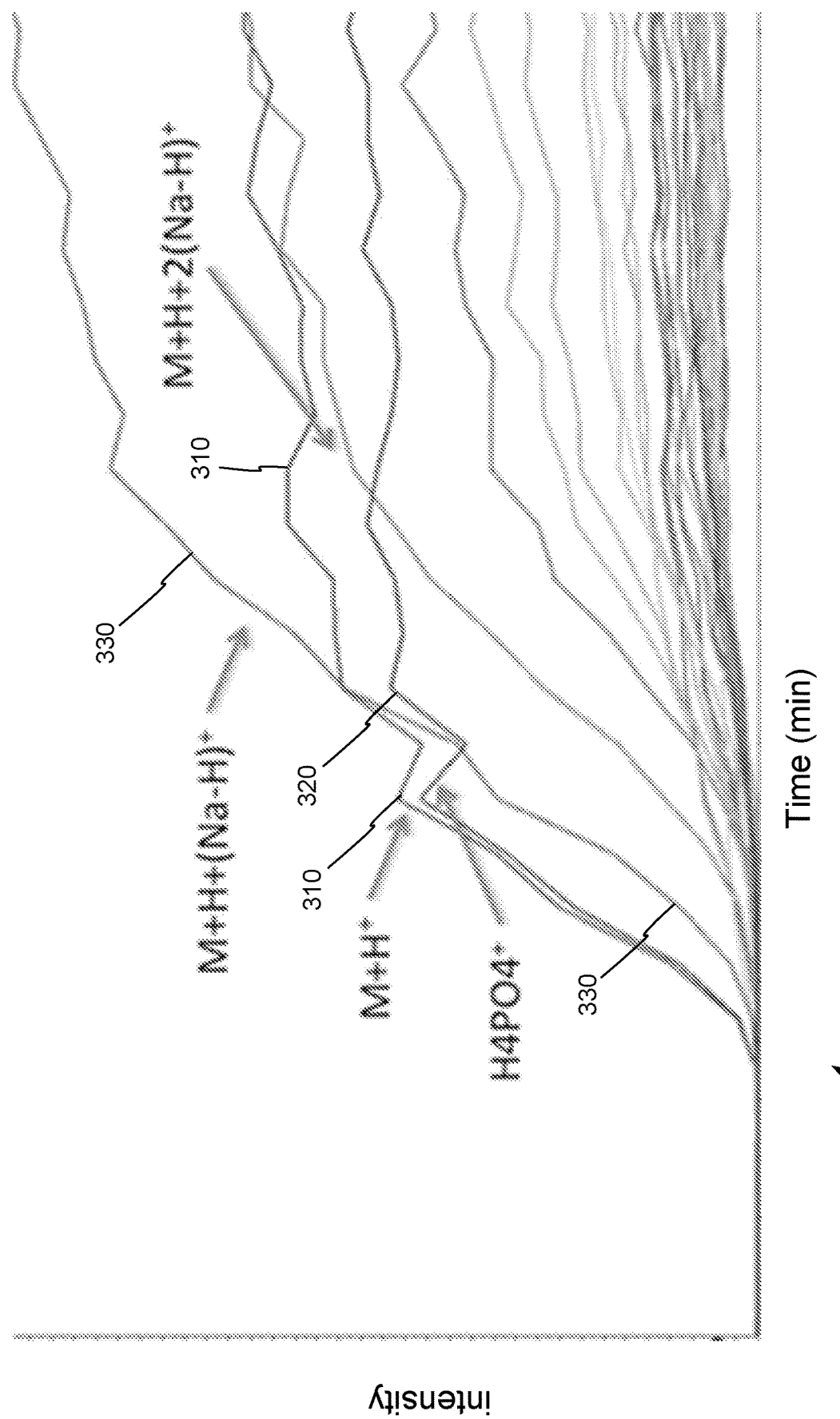
FIG. 3 is a plot of intensities of the ions of glycerol 3-phosphate versus time near the leading edge of the sample plug where the amount of glycerol 3-phosphate entering the ion source is increasing rapidly, in accordance with various embodiments.

FIG. 3 is a plot 300 of intensities of the ions of glycerol 3-phosphate versus time near the leading edge of the sample plug where the amount of glycerol 3-phosphate entering the ion source is increasing rapidly, in accordance with various embodiments. Plot 300 shows initially ion 310 (M+H+) and ion 320, the protonated phosphoric acid fragment ($H_4PO_4^+$), increase together but plateau, while the first adduct ion 330 continues to increase. Adduct ion 330, M+H+(Na—H)+, in fact, reaches a higher signal level than ion 310 (M+H+) itself, probably due to formation of the fragment from the latter.

Successive adducts are generated at slightly later times (higher concentrations) until the overall or combined signal reaches a maximum corresponding to the concentration of the introduced sample. This effect is observed in positive mode for a number of compounds, especially acids and phosphates with labile protons, and similar effects are observed in negative mode.

Plot 300 shows that the signal plateau observed for one species can be due, at least in part, to the formation of adducts and fragments in a concentration dependent way. Since quantitation is generally performed by examining fragments from a single molecular ion species, limiting the number of precursor ions in this way also limits the dynamic range. Furthermore, since the full spectrum is typically only examined during method development, the presence of these ions may not be apparent if the concentration range is low.

In various embodiments, when the signal of a compound of interest is distributed among multiple species it is possible to rescue it by summing the contributions of the individual ions. In other words, the quantitation dynamic range of a compound of interest can be extended by summing the contributions of the individual ions.

Figure 4:
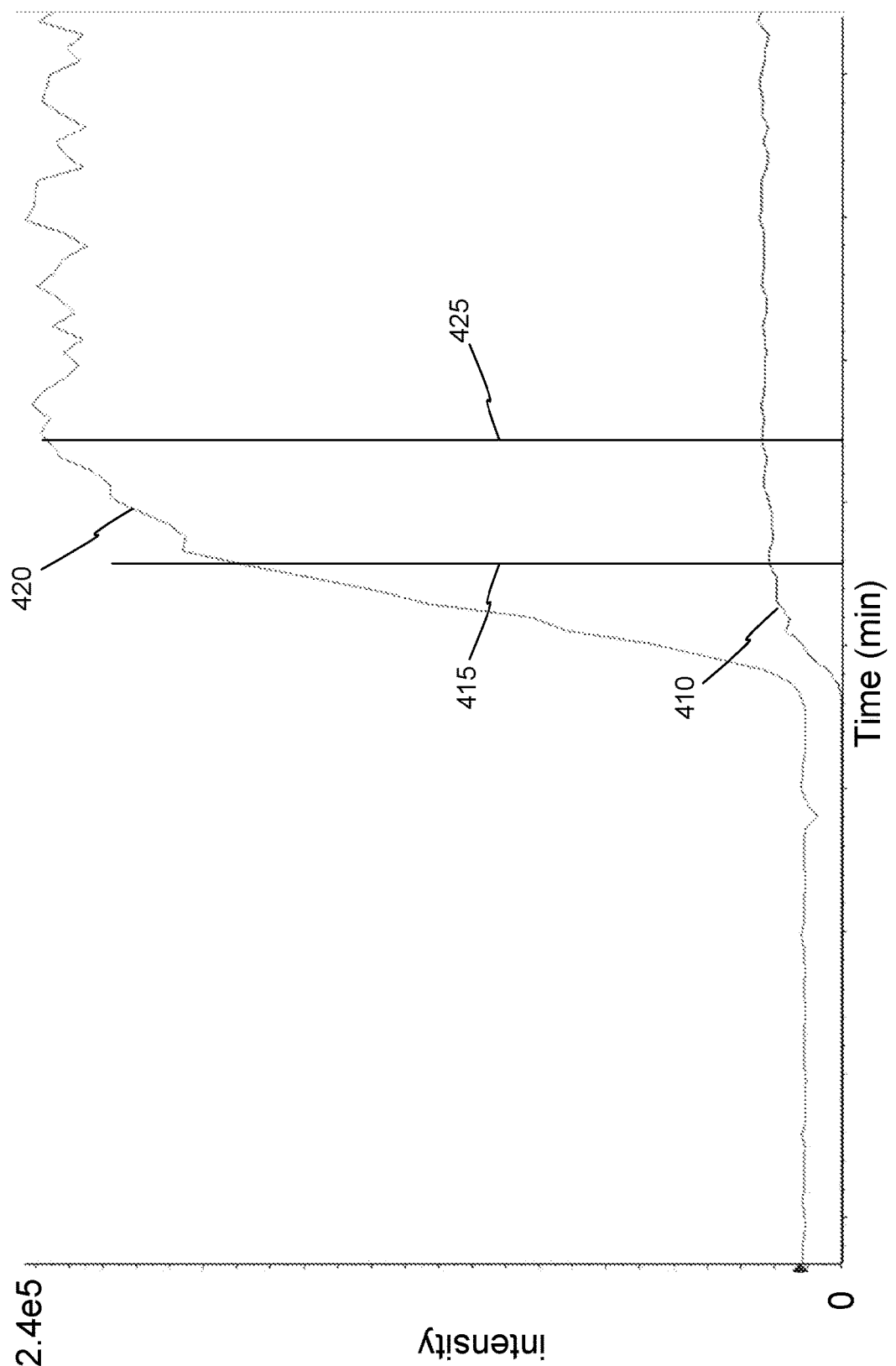
FIG. 4 is a plot of the intensity of the M+H+ ion of glycerol 3-phosphate and the summation of the intensities of many of the ions of glycerol 3-phosphate versus time near the leading edge of the sample plug where the amount of glycerol 3-phosphate entering the ion source is increasing rapidly, in accordance with various embodiments.

FIG. 4 is a plot 400 of the intensity of the M+H+ ion of glycerol 3-phosphate and the summation of the intensities of many of the ions of glycerol 3-phosphate versus time near the leading edge of the sample plug where the amount of glycerol 3-phosphate entering the ion source is increasing rapidly, in accordance with various embodiments. Plot 400 shows how dynamic range of the quantitation of glycerol 3-phosphate can be extended by summing contributions from all of the different ions of glycerol 3-phosphate. For example, the intensity 410 of the M+H+ precursor ion of glycerol 3-phosphate begins to plateau at time 415. In contrast, summed intensity 420 of many of the precursor ions of glycerol 3-phosphate does not plateau until time 425.

A goal of quantitation is to cover a large concentration range for the target compound of interest, this is known as the dynamic range. In mass spectrometry it is typically limited by the concentration at which the response shows a plateau, i.e., no longer increases with concentration, so that the response could arise from any higher concentration value. Thus, it is valuable to remove the plateau and increase the dynamic range, ideally with a response that increases linearly with concentration although any increase is preferable to a plateau.

In FIG. 4, intensity 410 of the M+H+ precursor ion of glycerol 3-phosphate plateaus between times 415 and 425. During this same time period, however, summed intensity 420 of many of the precursor ions of glycerol 3-phosphate is still increasing. As a result, summed intensity 420 has a greater dynamic range. Summed intensity 420 of many of the precursor ions of glycerol 3-phosphate should therefore be used to cover a larger concentration range for the target compound of interest.

From FIG. 4 it is clear that adding the contributions from many related molecular ion species will extend the dynamic range at concentrations where these ions are being generated. However there are a number of complicating factors. First, the adducts and fragment species may not be predictable, and hence cannot be pre-selected as precursor ions in an MRM experiment. This is particularly true if the adduct species (e.g., Na+) are introduced during sample preparation and may vary for different sample batches.

Second, during method development, the compound of interest could be introduced over a range of concentrations and the likely adduct/fragment species identified, but this may lead to a large number of target precursor ions, which would reduce the time available to target other compounds. This additional time is wasted, if the concentration is low so that the additional ion species are not formed.

Third, the additional ion species can be identified post-acquisition and their MS1 chromatograms summed. However, the additional specificity introduced by MS/MS will be lost.

Therefore, in various embodiments, compounds of interest are analyzed using SWATH® acquisition and quantitated by summing narrow mass range chromatograms from a range of individual SWATH® windows.

Figure 5:
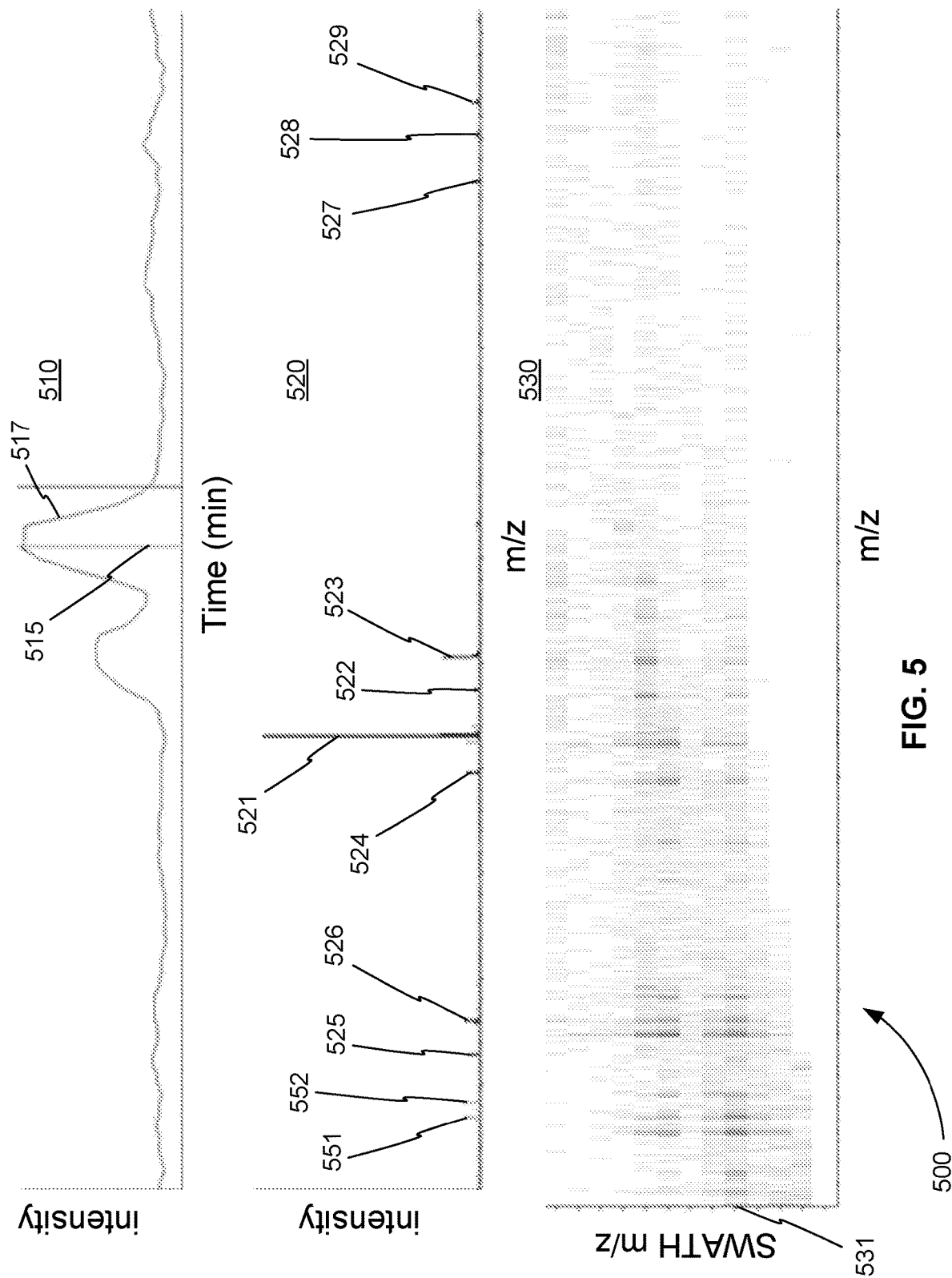
FIG. 5 is a series of plots showing how compounds of interest are analyzed using SWATH®, in accordance with various embodiments.

FIG. 5 is a series 500 of plots showing how compounds of interest are analyzed using SWATH®, in accordance with various embodiments. The plots of FIG. 5 show the results of analyzing a compound of interest (a major peak) in a urine sample using SWATH® acquisition. The SWATH® acquisition includes obtaining a precursor ion (MS) spectrum and a series of product ion spectra (MS/MS) for the following precursor ion windows: 49.5-120.8, 119.8-191, 190-261.2, 260.2-331.5, 330.5-401.8, 400.8-472, 471-542.2, 541.2-612.5, 611.5-682.8, 681.8-753, 752-823.2, and 822.2-893.5 m/z.

Plot 510 of FIG. 5 shows a portion of the total ion chromatogram (TIC) for all experiments (MS and MSMS). Plot 520 is an overlay of all spectra at time 515 of plot 510. In other words, plot 520 shows the spectra for peak 517 of plot 510. Plot 530 shows the spectra of plot 520 as individual strip charts.

In plot 520, the dominant precursor ion (MS) is shown near the middle of the plot. This precursor ion spectrum shows an M+H+ ion peak 521 at 265.1178 m/z, with Na and K adduct ion peaks 522 and 523 at 287.0973 and 303.0730 m/z, respectively. It shows peak 524 representing a loss of ammonia at 248.0906 m/z, and additional fragment peaks 525 and 526 at 114.0905 and 130.0488 m/z, respectively. It also shows dimer and related adduct peaks 527,528, and 529 at 529.2289, 551.2072 and 567.1862 m/z, respectively.

Product ion peaks 551 and 552 at 84.0436 and 91.0533, respectively, of plot 520 occur in the product ion spectrum from precursor ion window 531 of plot 530 with width 260.2-331.5 m/z. Precursor ion window 531 of plot 530 is the one that includes the M+H+ and some higher mass adducts but not the ammonia loss or the dimers.

From plot 530 it can be seen that product ion peaks 551, 552, and 526 of plot 520 at 84, 91 and 130 m/z, respectively, (but not product ion peak 525 at 114 m/z) appear in a number of individual SWATH® windows, predominantly those corresponding to major ions in the precursor ion spectrum. (In this example the contribution of these ions is not very strong as the concentration is still rather low).

Analyzing product ion peaks 551 and 526 of plot 520 at 84 and 130 m/z, respectively, shows how a compound of interest is quantitated by summing narrow mass range chromatograms from a range of individual SWATH® windows.

Figure 6:
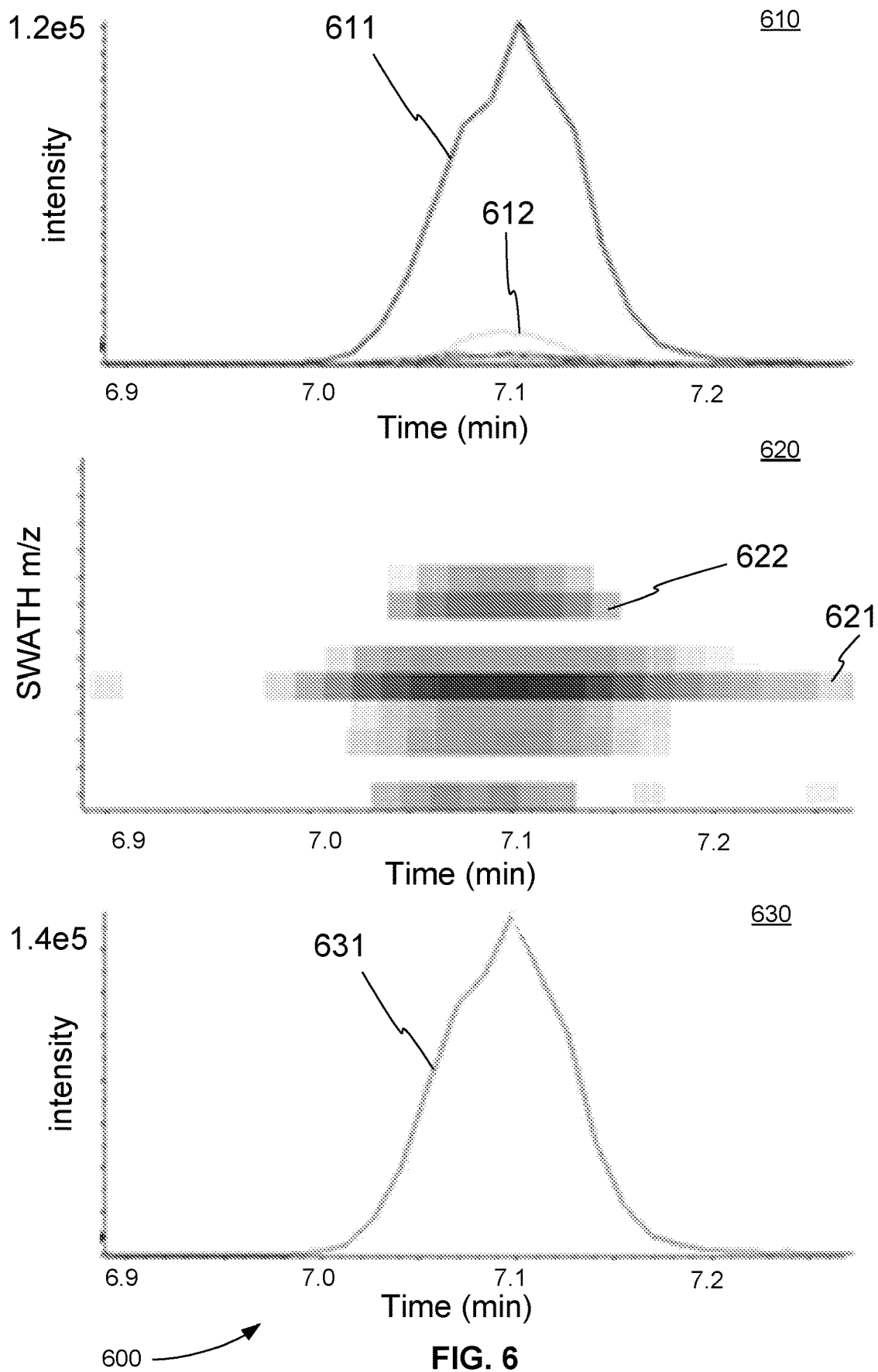
FIG. 6 is a series of plots showing how extracted ion chromatograms (XICs) for the product ion peak 551 at 84 m/z shown in FIG. 5 from different SWATH® windows can be summed, in accordance with various embodiments.

FIG. 6 is a series 600 of plots showing how extracted ion chromatograms (XICs) for the product ion peak 551 at 84 m/z shown in FIG. 5 from different SWATH® windows can be summed, in accordance with various embodiments. Plot 610 shows the individual product ion XICs for the product ion at 84 m/z for each SWATH® window, and plot 620 shows strip charts for the product ion at 84 m/z for all of the SWATH® windows. For example, plot 610 shows XIC 611 for SWATH® window 621 of plot 620, and plot 610 shows XIC 612 for SWATH® window 622 of plot 620.

Plot 630 shows XIC 631, which is the sum of all of the XICs for the product ion at 84 m/z shown in plot 610. For example, XIC 631 is produced from the summation of XIC 611, XIC 612, and all of the other XICs for the product ion at 84 m/z shown in plot 610. Plot 630 shows that the main contribution to XIC 631 is XIC 611 of plot 610. XIC 631 of plot 630 and XIC 611 of plot 610 have similar shapes. In addition, in this case the peak intensity of XIC 631 of plot 630 ($1.4 \times 10^5$) is only slightly larger than the peak intensity of XIC 611 of plot 610 ($1.2 \times 10^5$).

Figure 7:
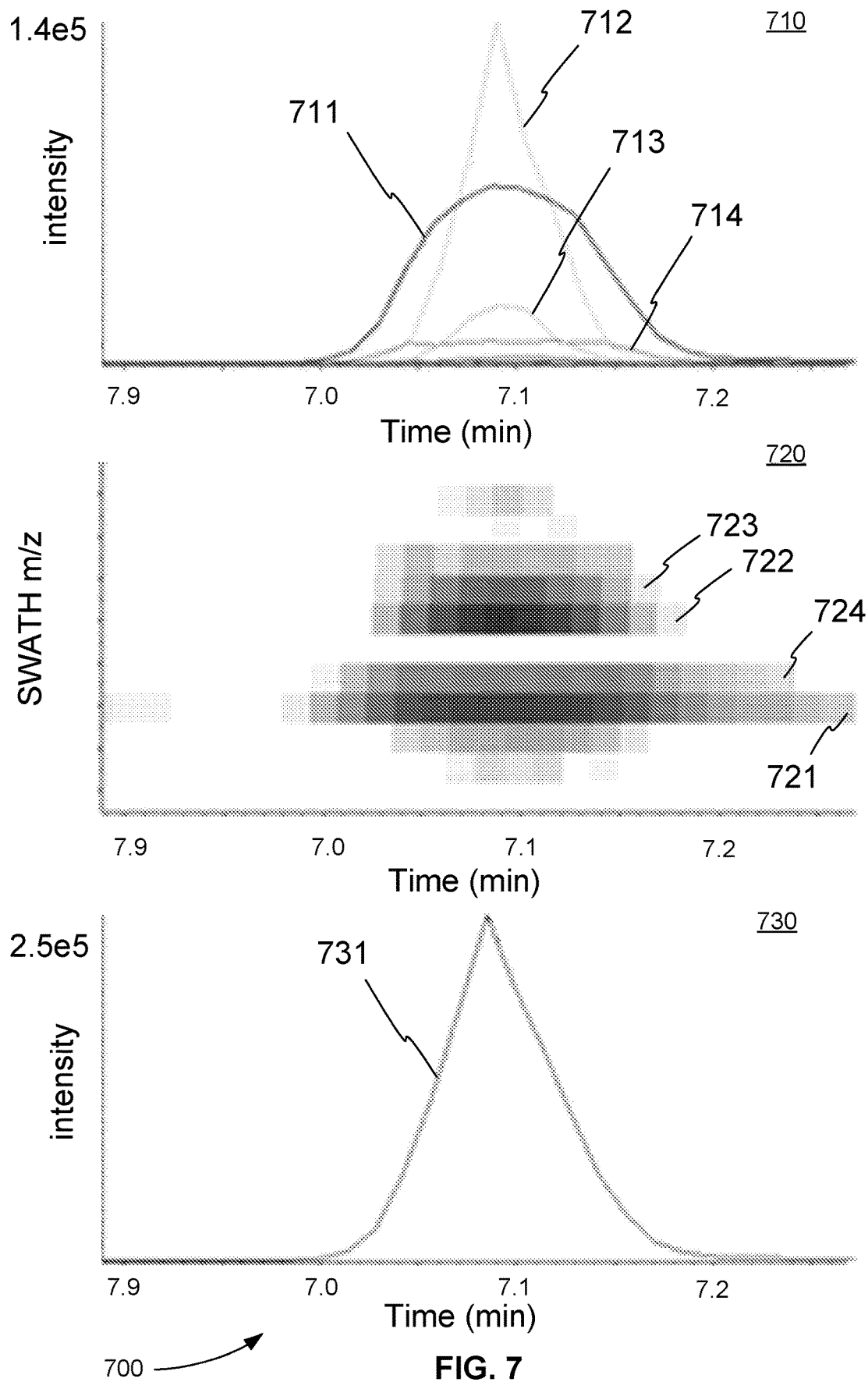
FIG. 7 is a series of plots showing how XICs for the product ion peak 526 at 130 m/z shown in FIG. 5 from different SWATH® windows can be summed, in accordance with various embodiments.

FIG. 7 is a series 700 of plots showing how XICs for the product ion peak 526 at 130 m/z shown in FIG. 5 from different SWATH® windows can be summed, in accordance with various embodiments. Plot 710 shows the individual product ion XICs for the product ion at 130 m/z for each SWATH® window, and plot 720 shows strip charts for the product ion at 130 m/z for all of the SWATH® windows. For example, plot 710 shows XIC 711 for SWATH® window 721 of plot 720, XIC 712 for SWATH® window 722 of plot 720, XIC 713 for SWATH® window 723 of plot 720, and XIC 714 for SWATH® window 724 of plot 720.

Plot 730 shows XIC 731, which is the sum of all of the XICs for the product ion at 130 m/z shown in plot 710. For example, XIC 731 is produced from the summation of XIC 711, XIC 712, XIC 713, XIC 714, and all of the other XICs for the product ion at 130 m/z shown in plot 710. Plot 730 shows that there is no single main contributor to XIC 731. XIC 711, XIC 712, XIC 713, and XIC 714 of plot 710 all provide significant contributions to XIC 731 of plot 730. In fact, the intensity of XIC 731 of plot 730 is approximately twice the intensity of the individual peak with the highest intensity (XIC 712 of plot 710).

A comparison of FIGS. 6 and 7 shows that summing the contributions of a product ion from different SWATH® windows can provide a modest improvement in the intensity measured (FIG. 6) or a dramatic improvement (FIG. 7). These improvements in intensity, in turn, extend the overall dynamic range for the compound of interest.

There is an assumption that the different molecular ions have similar responses and fragmentation efficiencies; this may not be true, but adding their XICs is probably still better than not doing so. It may also be possible to determine the response factors by analyzing standards at different concentrations and using these standards to scale the different XICs before summing.

One of ordinary skill in the art can appreciate that the XICs shown in FIGS. 6 and 7 are those portions of the XICs usually referred to as XIC peaks. Typically, an XIC includes one peak representing the product ion. However, in some circumstances, there can be more than one XIC peak. Although XIC is used throughout this description, one of ordinary skill in the art will understand that XIC peak can be used interchangeability with XIC.

System for Extending the Dynamic Range

Figure 8:
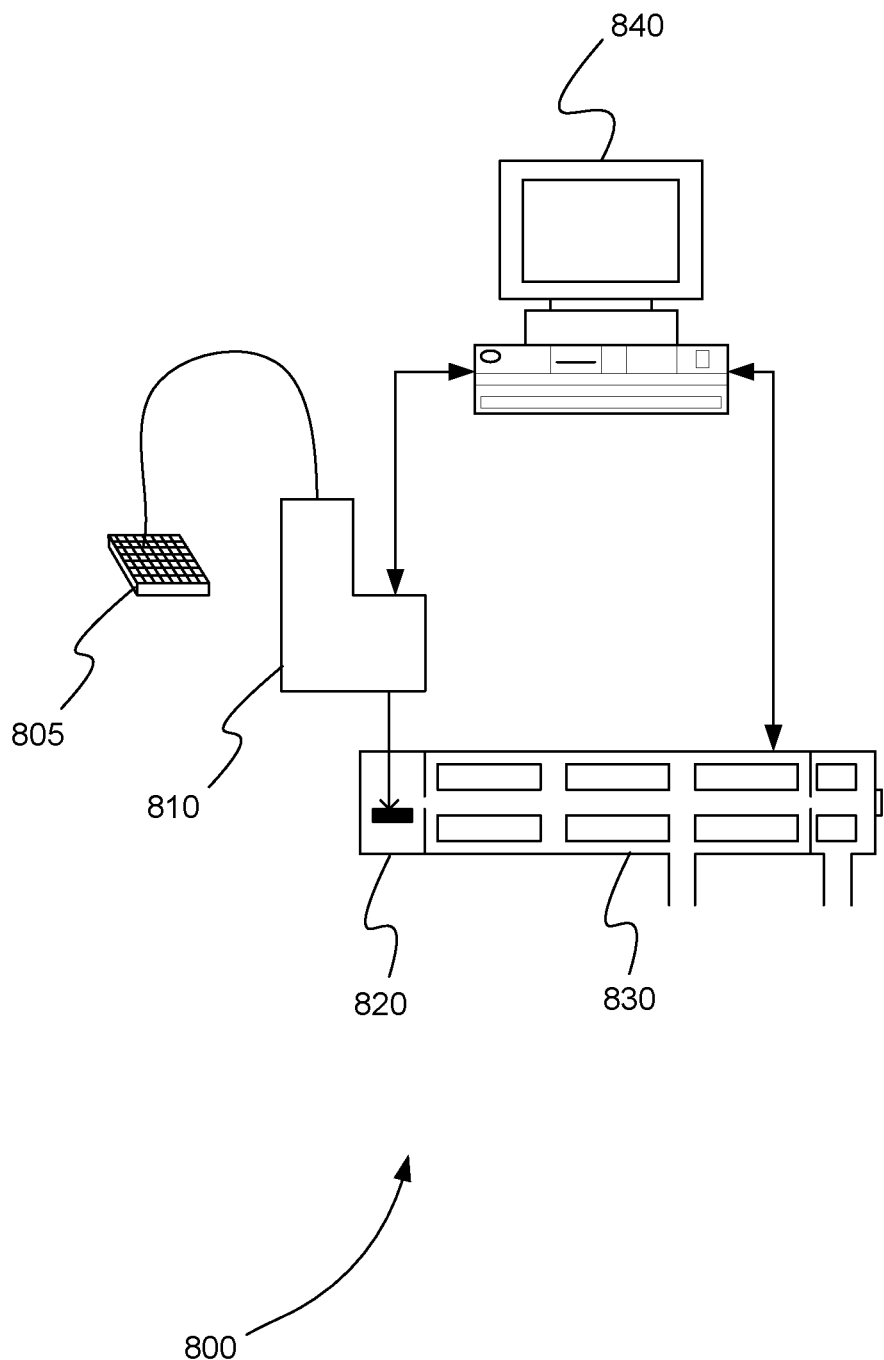
FIG. 8 is a schematic diagram showing a system for extending the dynamic range of a quantitation calculation of a known compound of interest by combining two or more product ion extracted ion chromatograms (XICs) produced from two or more different precursor ions of the known compound of interest for the same product ion using a data independent acquisition (DIA) method, in accordance with various embodiments.

FIG. 8 is a schematic diagram 800 showing a system for extending the dynamic range of a quantitation calculation of a known compound of interest by combining two or more product ion extracted ion chromatograms (XICs) produced from two or more different precursor ions of the known compound of interest for the same product ion using a data independent acquisition (DIA) method, in accordance with various embodiments. SWATH® acquisition is an exemplary DIA method. The system of FIG. 8 includes sample introduction device 810, ion source device 820, tandem mass spectrometer 830, and processor 840.

Sample introduction device 810 introduces a sample that includes one or more compounds of interest to the system over time. A sample is obtained from sample plate 805, for example. Sample introduction device 810 can perform techniques that include, but are not limited to, ion mobility, gas chromatography (GC), liquid chromatography (LC), capillary electrophoresis (CE), or flow injection analysis (FIA).

Ion source device 820 ionizes the sample to transform the sample into an ion beam. Ion source device 820 can perform ionization techniques that include, but are not limited to, matrix assisted laser desorption/ionization (MALDI) or electrospray ionization (ESI).

Tandem mass spectrometer 830 divides a precursor ion mass range of interest into a plurality of precursor ion mass selection windows for a DIA method. Tandem mass spectrometer 830 performs the DIA method on the ion beam at each acquisition time of a plurality of acquisition times. The DIA method is performed by, for each window of the plurality of precursor ion mass selection windows, fragmenting the precursor ions in the window producing product ions and mass analyzing the product ions produced. A product ion spectrum is produced for each window of the plurality of precursor ion mass selection windows at each acquisition time of the plurality of acquisition times. Therefore, over the plurality of acquisition times, a plurality of product ion spectra are produced for each window of the plurality of precursor ion mass selection windows.

Figure 9:
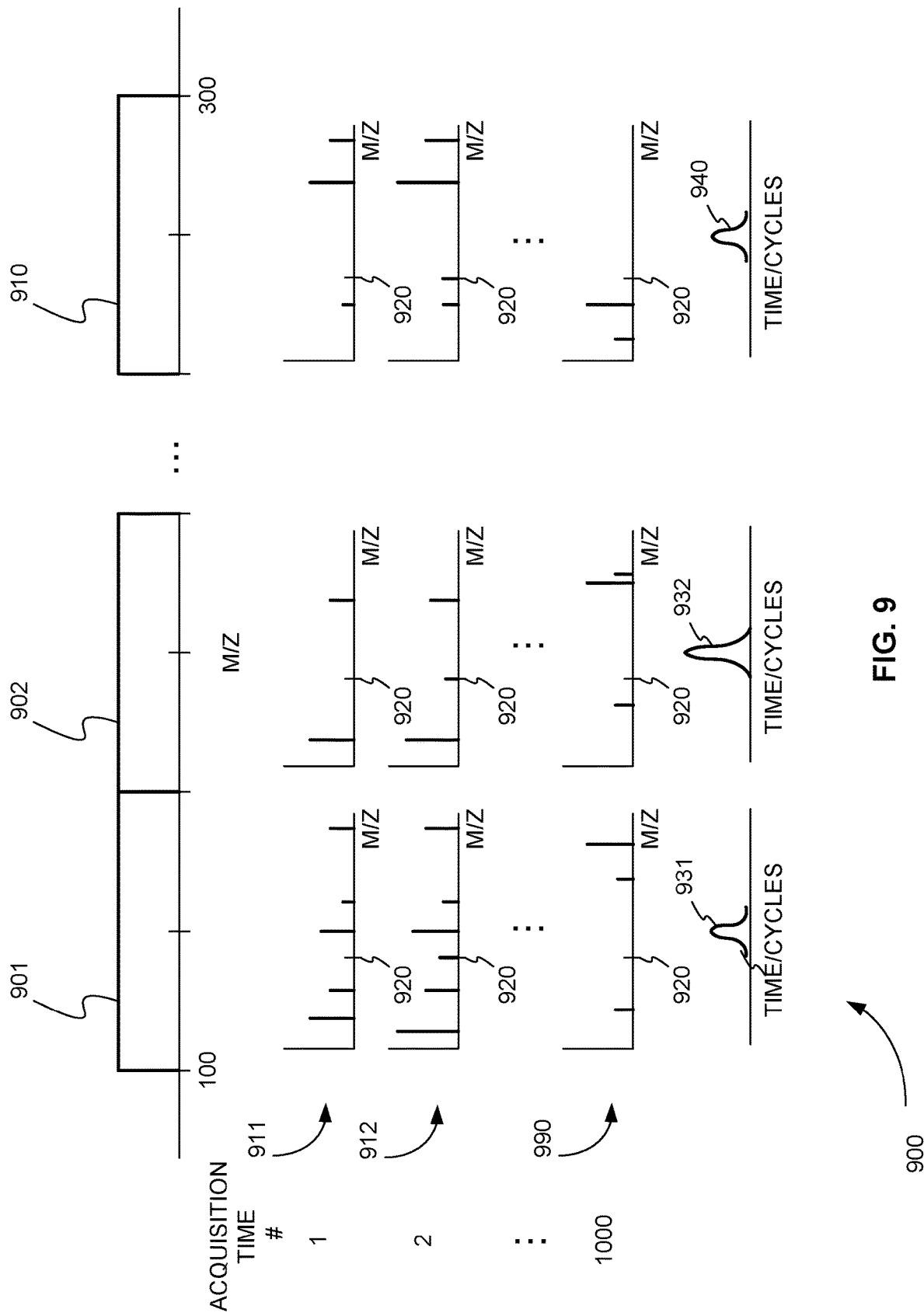
FIG. 9 is an exemplary diagram showing how a plurality of product ion spectra are produced for each window of the plurality of precursor ion mass selection windows over a plurality of acquisition times, in accordance with various embodiments.

FIG. 9 is an exemplary diagram 900 showing how a plurality of product ion spectra are produced for each window of the plurality of precursor ion mass selection windows over a plurality of acquisition times, in accordance with various embodiments. For example, a precursor ion mass range of interest of 200 m/z is divided into 10 precursor ion mass selection windows that are each 20 m/z wide. FIG. 9 shows the precursor ion mass range of interest between 100 and 300 m/z and three of the precursor ion mass selection windows 901, 902, and 910. Although the precursor ion mass selection windows of FIG. 9 all have the same width and are non-overlapping, precursor ion mass selection windows of different widths and precursor ion mass selection windows that overlap can be used.

At each acquisition time of a plurality of acquisition times, precursor ions of each window of the plurality of precursor ion mass selection windows are fragmented, producing product ions, and the resulting product ions are mass analyzed. FIG. 9 shows product ion spectra produced from the mass analysis of the product ions of precursor ion mass selection windows 901, 902, and 910 at three acquisition times. For example, for precursor ion mass selection window 901, product ion spectrum 911 is produced at acquisition time 1, product ion spectrum 912 is produced at acquisition time 2, and product ion spectrum 990 is produced at acquisition time 1000. As a result, for each of precursor ion mass selection windows of FIG. 9, 1,000 product ion spectra are produced.

Returning to FIG. 8, tandem mass spectrometer 830 is shown as a triple quadrupole device. One of ordinary skill in the art can appreciate that tandem mass spectrometer 830 can include other types of mass spectrometry devices including, but not limited to, ion traps, orbitraps, time-of-flight (TOF) devices, or Fourier transform ion cyclotron resonance (FT-ICR) devices.

Processor 840 can be, but is not limited to, a computer, a microprocessor, the computer system of FIG. 1, or any device capable of sending and receiving control signals and data from tandem mass spectrometer 830 and processing data. Processor 840 is in communication with sample introduction device 810, ion source device 820, and tandem mass spectrometer 830.

Processor 840 receives a plurality of product ion spectra for each window of the plurality of precursor ion mass selection windows over the plurality of acquisition times from tandem mass spectrometer 830. Processor 840 selects a mass-to-charge ratio (m/z) value for at least one known product ion of the compound of interest. Processor 840 calculates an XIC for the m/z value from a plurality of product ion spectra for each of two or more different windows of the plurality of precursor ion mass selection windows. This calculation produces two or more XICs for the m/z value. Processor 840 combines the two or more XICs into a single XIC that has a larger dynamic range. Finally, processor 840 calculates a quantity for the compound of interest using the single XIC.

Returning to FIG. 9, for example, 1,000 product ion spectra are received for each of ten precursor ion mass selection windows, including windows 901, 902, and 910. A product ion of the compound of interest with m/z value 920 is selected. XIC 931 is calculated for m/z value 920 from the 1,000 product ion spectra of precursor ion mass selection window 901. XIC 932 is calculated for m/z value 920 from the 1,000 product ion spectra of precursor ion mass selection window 902. XIC 940 is calculated for m/z value 920 from the 1,000 product ion spectra of precursor ion mass selection window 910. XICs 931, 932, and 940 can be combined into a single XIC (not shown) that has a larger dynamic range.

Returning to FIG. 8, in various embodiments, processor 840 of FIG. 8 combines the two or more XICs into a single XIC by summing the two or more XICs.

In various embodiments, XICs are calculated for all precursor ion mass selection windows and all of the XICs are simply combined to produce the single XIC. For example, processor 840 calculates an XIC for the m/z value from the plurality of product ion spectra of each window of the plurality of precursor ion mass selection windows, producing an XIC for each window of the plurality of precursor ion mass selection windows. Processor 840 then combines the XICs of all windows of the plurality of precursor ion mass selection windows into a single XIC that has a larger dynamic range.

In various embodiments, XICs are calculated for all precursor ion mass selection windows, however only the XICs that provide the best performance by some measure are combined to produce the single XIC. For example, only XICs that provide the best signal to noise, linearity, or correlation with a standard are combined. As before, processor 840 can calculate an XIC for the m/z value from the plurality of product ion spectra of each window of the plurality of precursor ion mass selection windows. An XIC is then produced for each window of two or more different windows of the plurality of precursor ion mass selection windows.

In this embodiment, however, XICs of all windows of the plurality of precursor ion mass selection windows are combined in every possible permutation. A plurality of combined XIC permutations is produced. Each combined XIC of the plurality of combined XIC permutations is compared a standard calibration curve for the compound of interest. A combined XIC of the plurality of combined XIC permutations that best matches the standard calibration curve for the compound of interest is selected as the single XIC.

In various embodiments, the two or more XICs from two or more precursor ion mass selection windows are combined regardless of whether or not they have an obvious relationship to the molecular ion (compound of interest). In other words, the product ions alone are relied upon to provide specificity. For example, processor 840 combines the two or more XICs into a single XIC of the two or more different windows of the plurality of precursor ion mass selection windows without determining if the two or more different windows of the plurality of precursor ion mass selection windows include a known precursor ion of the compound of interest.

In various embodiments, the two or more XICs are combined using scores or weightings to filter or weight the XICs. Criteria for weighting XICs can include, but are not limited to, retention time, correlation with a dominant species, mass accuracy, potential for interferences, or signal-to-noise. For example, processor 840 combines the two or more XICs into a single XIC by calculating a weighted sum of the two or more XICs. Processor 840 weights the two or more XICs according to retention time, correlation with a dominant precursor ion, mass accuracy, correlation with an interfering precursor ion, or signal-to-noise ratio.

In various embodiments, response factors from a standard solution at different concentrations are measured and used to weight or scale XIC intensity values before they are combined. For example, the two or more XICs are weighted or scaled according to the relative response of the tandem mass spectrometer in fragmenting the precursor ion of each XIC of the two or more XICs.

In various embodiments, the system of FIG. 8 is used to optimize the SWATH® method for the compound of interest. The acquisition is optimized to produce the best performance and the smallest analysis time, i.e., the fewest windows and shortest LC time, by iteratively varying the number of precursor ion windows, the precursor ion window widths, or the produce ion selected. For example, processor 840 iteratively repeats the analysis of the sample one or more additional times. In each iteration, the precursor ion mass range of interest is divided into different two or more precursor ion mass selection windows. After each iteration, the single XIC produced is compared with single XICs of other iterations to determine an optimum set of two or more precursor ion mass selection windows for the compound of interest.

In various embodiments, the optimized SWATH® method for the compound of interest is used to determine precursor ion targets for a conventional MRM analysis.

Method for Extending the Dynamic Range

Figure 10:
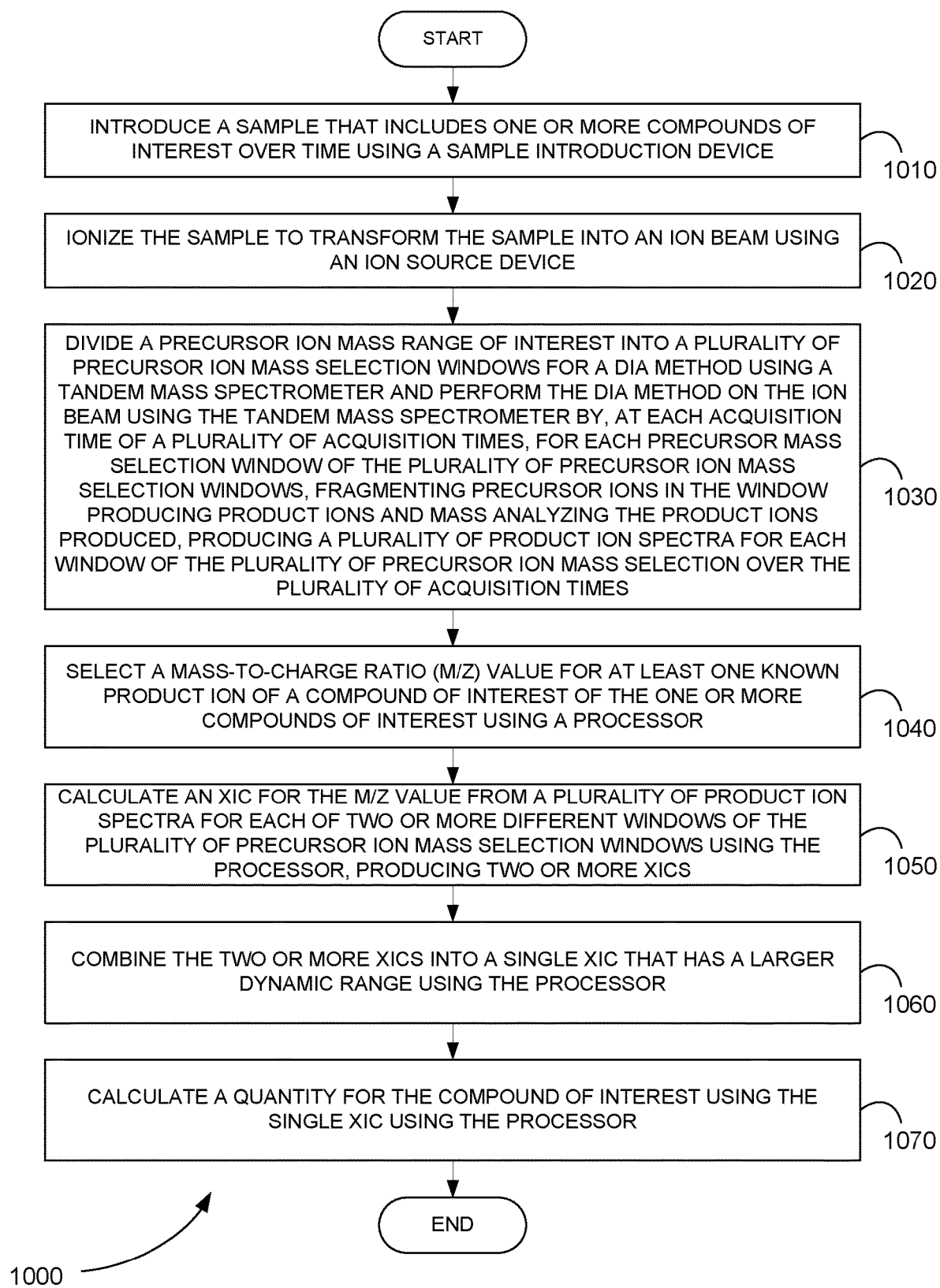
FIG. 10 is a flowchart showing a method for extending the dynamic range of a quantitation calculation of a known compound of interest by combining two or more product XICs produced from two or more different precursor ions of the known compound of interest for the same product ion using a DIA method, in accordance with various embodiments.

FIG. 10 is a flowchart showing a method 1000 for extending the dynamic range of a quantitation calculation of a known compound of interest by combining two or more product XICs produced from two or more different precursor ions of the known compound of interest for the same product ion using a DIA method, in accordance with various embodiments.

In step 1010 of method 1000, a sample that includes one or more compounds of interest is introduced over time using a sample introduction device.

In step 1020, the sample is ionized to transform the sample into an ion beam using an ion source device.

In step 1030, a precursor ion mass range of interest is divided into a plurality of precursor ion mass selection windows for a DIA method using a tandem mass spectrometer. The DIA method is then performed on the ion beam using the tandem mass spectrometer. The DIA method is performed by, at each acquisition time of a plurality of acquisition times, for each precursor mass selection window of the plurality of precursor ion mass selection windows, fragmenting precursor ions in the window producing product ions and mass analyzing the product ions produced. A plurality of product ion spectra are produced for each window of the plurality of precursor ion mass selection over the plurality of acquisition times.

In step 1040, a mass-to-charge ratio (m/z) value for at least one known product ion of a compound of interest of the one or more compounds of interest is selected using a processor.

In step 1050, an XIC is calculated for the m/z value from a plurality of product ion spectra for each of two or more different windows of the plurality of precursor ion mass selection windows using the processor. This calculation produces two or more XICs for the m/z value.

In step 1060, the two or more XICs are combined into a single XIC that has a larger dynamic range using the processor.

In step 1070, a quantity for the compound of interest is calculated using the single XIC using the processor.

System for Determining that the Dynamic Range can be Extended

Various embodiments include a system for determining if the quantitation dynamic range of a known compound of interest using a single XIC can be increased by including one or more additional XICs in the quantitation calculation using a DIA mass spectrometry method. More specifically, it is determined before, during, or after a quantitation of a known compound of interest using one XIC if the dynamic range of the quantitation can be increased by including one or more additional XICs in the quantitation calculation. The determination is made using a DIA method.

Returning to FIG. 8, this system also includes sample introduction device 810, ion source device 820, tandem mass spectrometer 830, and processor 840. As in the system to extend the dynamic range, this system uses the sample introduction device 810, ion source device 820, and tandem mass spectrometer 830 to produce a plurality of product ion spectra for each window of the plurality of precursor ion mass selection over the plurality of acquisition times.

Also, in the system to extend the dynamic range, processor 840 calculates two or more XICs for the same product ion from the spectra for each window. Specifically, processor 840 receives a plurality of product ion spectra for each window of the plurality of precursor ion mass selection windows over the plurality of acquisition times from tandem mass spectrometer 830. Processor 840 selects an m/z value for at least one known product ion of the compound of interest. Processor 840 calculates an XIC for the m/z value from a plurality of product ion spectra for each of two or more different windows of the plurality of precursor ion mass selection windows. This calculation produces two or more XICs for the m/z value.

In this system, however, processor 840 calculates a ratio of an XIC of the two or more XICs to at least one other XIC of the two or more XICs. If the ratio exceeds a threshold, processor 840 determines that the dynamic range of a quantitation calculation of the known compound of interest cannot be extended and calculates a quantity of the known compound of interest using the XIC. In other words, processor 840 compares a first XIC to one or more other XICs. If the comparison shows that the one or more other XICs are unlikely to extend the dynamic range, then the quantity of the known compound of interest is simply calculated from the first XIC.

In various embodiments, if the comparison shows that the one or more other XICs are likely to extend the dynamic range, the first XIC can be combined with the one or more other XICs to perform the quantitation. Specifically, if the ratio does not exceed the threshold, processor 840 determines that the dynamic range of a quantitation calculation of the known compound of interest can be extended and combines at least two of the two or more XICs into a single XIC that has a larger dynamic range. Processor 840 then calculates a quantity for the compound of interest using the single XIC.

Alternatively, in various embodiments, if the comparison shows that the one or more other XICs are likely to extend the dynamic range, the first XIC can still be used to calculate the quantity of the known compound of interest. However, the result can be flagged as a potential error.

Method for Determining that the Dynamic Range can be Extended

Figure 11:
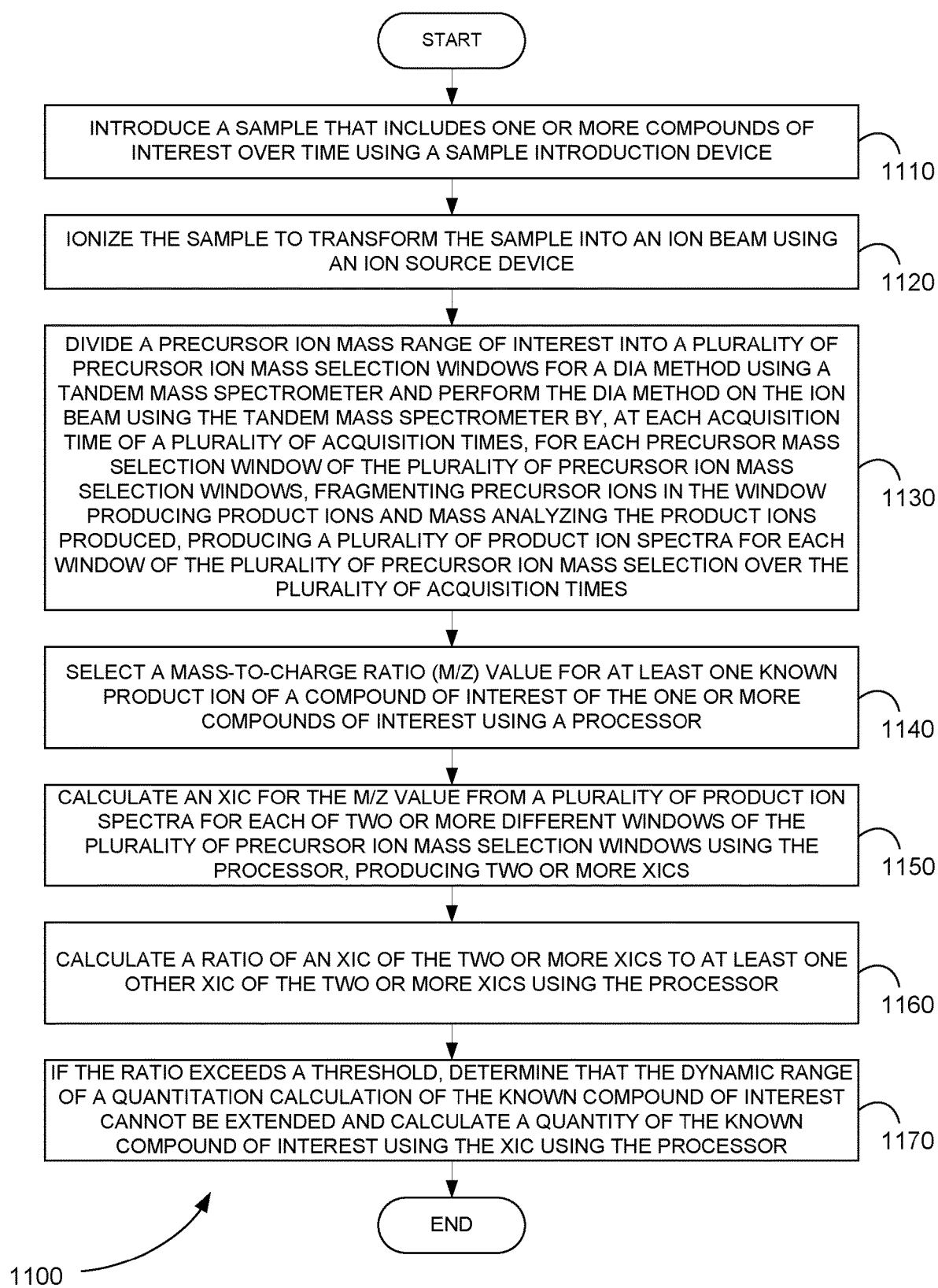
FIG. 11 is a flowchart showing a method for determining if the quantitation dynamic range of a known compound of interest using a single XIC can be increased by including one or more additional XICs in the quantitation calculation using a DIA mass spectrometry method, in accordance with various embodiments.

FIG. 11 is a flowchart showing a method 1100 for determining if the quantitation dynamic range of a known compound of interest using a single XIC can be increased by including one or more additional XICs in the quantitation calculation using a DIA mass spectrometry method, in accordance with various embodiments.

In step 1110 of method 1100, a sample that includes one or more compounds of interest is introduced over time using a sample introduction device.

In step 1120, the sample is ionized to transform the sample into an ion beam using an ion source device.

In step 1130, a precursor ion mass range of interest is divided into a plurality of precursor ion mass selection windows for a DIA method using a tandem mass spectrometer. The DIA method is then performed on the ion beam using the tandem mass spectrometer. The DIA method is performed by, at each acquisition time of a plurality of acquisition times, for each precursor mass selection window of the plurality of precursor ion mass selection windows, fragmenting precursor ions in the window producing product ions and mass analyzing the product ions produced. A plurality of product ion spectra are produced for each window of the plurality of precursor ion mass selection over the plurality of acquisition times.

In step 1140, a mass-to-charge ratio (m/z) value for at least one known product ion of a compound of interest of the one or more compounds of interest is selected using a processor.

In step 1150, an XIC is calculated for the m/z value from a plurality of product ion spectra for each of two or more different windows of the plurality of precursor ion mass selection windows using the processor. This calculation produces two or more XICs for the m/z value.

In step 1160, a ratio of an XIC of the two or more XICs to at least one other XIC of the two or more XICs is calculated using the processor.

In step 1170, if the ratio exceeds a threshold, it is determined that the dynamic range of a quantitation calculation of the known compound of interest cannot be extended and a quantity of the known compound of interest is calculated using the XIC using the processor.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for extending the dynamic range of a quantitation calculation of a known compound of interest by combining two or more product ion extracted ion chromatograms (XICs) for the same product ion produced from two or more different precursor ions of the known compound of interest using a data independent acquisition (DIA) method, comprising:
   (a) a sample introduction device that introduces a sample that includes one or more compounds of interest over time;
   (b) an ion source device that ionizes the sample to transform the sample into an ion beam;
   (c) a tandem mass spectrometer that divides a precursor ion mass range of interest into a plurality of precursor ion mass selection windows for a DIA method and performs the DIA method on the ion beam by, at each acquisition time of a plurality of acquisition times, for each precursor mass selection window of the plurality of precursor ion mass selection windows, fragmenting precursor ions in the window producing product ions and mass analyzing the product ions produced, producing a plurality of product ion spectra for each window of the plurality of precursor ion mass selection over the plurality of acquisition times; and (d) a processor in communication with the tandem mass spectrometer that
  (d)(i) receives a plurality of product ion spectra for each window of the plurality of precursor ion mass selection windows from the tandem mass spectrometer,
  (d)(ii) selects a mass-to-charge ratio (m/z) value for at least one known product ion of a compound of interest of the one or more compounds of interest;
  (d)(iii) calculates an XIC for the m/z value from a plurality of product ion spectra for each of two or more different windows of the plurality of precursor ion mass selection windows, producing two or more XICs,
  (d)(iv) combines the two or more XICs into a single XIC that has a larger dynamic range and combines the two or more XICs of the two or more different windows of the plurality of precursor ion mass selection windows without determining if the two or more different windows include a known precursor ion of the compound of interest, and
  (d)(v) calculates a quantity for the compound of interest using the single XIC.

2. The system of claim 1, wherein step (d)(iv) comprises summing the two or more XICs into the single XIC that has a larger dynamic range.

3. The system of claim 1, wherein steps (d)(iii) and (d)(iv) comprise
  calculating an XIC for the m/z value from the plurality of product ion spectra of each window of the plurality of precursor ion mass selection windows, producing an XIC for each window of the plurality of precursor ion mass selection windows and
  combining XICs of all windows of the plurality of precursor ion mass selection windows into a single XIC that has a larger dynamic range.

4. The system of claim 1, wherein steps (d)(iii) and (d)(iv) comprise
  calculating an XIC for the m/z value from the plurality of product ion spectra of each window of the plurality of precursor ion mass selection windows, producing an XIC for each window of the plurality of precursor ion mass selection windows,
  combining combinations of XICs of all windows of the plurality of precursor ion mass selection windows, producing a plurality of XIC combinations,
  selecting a combined XIC of the plurality of XIC combinations that has the greatest dynamic range for the compound of interest.

5. The system of claim 1, wherein step (d)(iv) comprises combining the two or more XICs into a single XIC by calculating a weighted sum of the two or more XICs.

6. The system of claim 5, wherein the processor weights the two or more XICs according to retention time, correlation with a dominant precursor ion, mass accuracy, correlation with an interfering precursor ion, or a signal-to-noise ratio.

7. The system of claim 5, wherein the processor weights the two or more XICs according to the relative response of the tandem mass spectrometer in fragmenting the precursor ion of each XIC of the two or more XICs.

8. The system of claim 1, iteratively repeating steps (a)-(d) one or more additional times and in each iteration dividing the precursor ion mass range of interest into different two or more precursor ion mass selection windows in step (c) and comparing the single XIC produced with single XICs of other iterations to determine an optimum set of two or more precursor ion mass selection windows for the compound of interest.

9. A method for extending the dynamic range of a quantitation calculation of a known compound of interest by combining two or more product ion extracted ion chromatograms (XICs) produced from two or more different precursor ions of the known compound of interest for the same product ion using a data independent acquisition (DIA) mass spectrometry method, comprising:
  (a) introducing a sample that includes one or more compounds of interest over time using a sample introduction device;
  (b) ionizing the sample to transform the sample into an ion beam using an ion source device;
  (c) dividing a precursor ion mass range of interest into a plurality of precursor ion mass selection windows for a DIA method using a tandem mass spectrometer and performing the DIA method on the ion beam using the tandem mass spectrometer by, at each acquisition time of a plurality of acquisition times, for each precursor mass selection window of the plurality of precursor ion mass selection windows, fragmenting precursor ions in the window producing product ions and mass analyzing the product ions produced, producing a plurality of product ion spectra for each window of the plurality of precursor ion mass selection over the plurality of acquisition times;
  (d) selecting a mass-to-charge ratio (m/z) value for at least one known product ion of a compound of interest of the one or more compounds of interest using a processor;
  (e) calculating an XIC for the m/z value from a plurality of product ion spectra for each of two or more different windows of the plurality of precursor ion mass selection windows using the processor, producing two or more XICs;
  (f) combining the two or more XICs into a single XIC that has a larger dynamic range, and combining the two or more XICs of the two or more different windows of the plurality of precursor ion mass selection windows without determining if the two or more different windows include a known precursor ion of the compound of interest, using the processor; and
  (g) calculating a quantity for the compound of interest using the single XIC using the processor.

10. A system for determining if the quantitation dynamic range of a known compound of interest using a single ion extracted ion chromatograms (XIC) can be increased by including one or more additional XICs in the quantitation calculation using a data independent acquisition (DIA) method, comprising:
  (a) a sample introduction device that introduces a sample that includes one or more compounds of interest over time;
  (b) an ion source device that ionizes and transforms the sample into an ion beam;
  (c) a tandem mass spectrometer that divides a precursor ion mass range of interest into a plurality of precursor ion mass selection windows for a DIA method and performs the DIA method on the ion beam by, at each acquisition time of a plurality of acquisition times, for each precursor mass selection window of the plurality of precursor ion mass selection windows, fragmenting precursor ions in the window producing product ions and mass analyzing the product ions produced, producing a plurality of product ion spectra for each window of the plurality of precursor ion mass selection over the plurality of acquisition times; and (d) a processor in communication with the tandem mass spectrometer that (d)(i) receives a plurality of product ion spectra for each window of the plurality of precursor ion mass selection windows from the tandem mass spectrometer, (d)(ii) selects a mass-to-charge ratio (m/z) value for at least one known product ion of a compound of interest of the one or more compounds of interest;

(d)(iii) calculates an XIC for the m/z value from a plurality of product ion spectra for each of two or more different windows of the plurality of precursor ion mass selection windows, producing two or more XICs, (d)(iv) calculates a ratio of an XIC of the two or more XICs to at least one other XIC of the two or more XICs, (d)(v) if the ratio exceeds a threshold, determines that the dynamic range of a quantitation calculation of the known compound of interest cannot be extended and calculates a quantity of the known compound of interest using the XIC, and (d)(vi) if the ratio does not exceed the threshold, determines that the dynamic range of a quantitation calculation of the known compound of interest can be extended, combines at least two of the two or more XICs into a single XIC that has a larger dynamic range, combines the two or more XICs of the two or more different windows of the plurality of precursor ion mass selection windows without determining if the two or more different windows include a known precursor ion of the compound of interest, and calculates a quantity for the compound of interest using the single XIC.

* * * * *